US012776015B2

(12) United States Patent
Ishikawa et al.

(10) Patent No.: US 12,776,015 B2
(45) Date of Patent: Oct. 27, 2026

(54) IMAGE RESTORATION SYSTEM AND IMAGE RESTORATION METHOD

(71) Applicant: Hitachi High-Tech Corporation, Tokyo (JP)

(72) Inventors: Masayoshi Ishikawa, Tokyo (JP); Sota Komatsu, Tokyo (JP); Yasutaka Toyoda, Tokyo (JP); Shinichi Shinoda, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 538 days.

(21) Appl. No.: 18/021,219

(22) PCT Filed: Sep. 29, 2020

(86) PCT No.: PCT/JP2020/036792
§ 371 (c)(1),
(2) Date: Feb. 14, 2023

(87) PCT Pub. No.: WO2022/070236
PCT Pub. Date: Apr. 7, 2022

(65) Prior Publication Data
US 2023/0298137 A1 Sep. 21, 2023

(51) Int. Cl.
*G06T 5/80* (2024.01)
*G06T 5/50* (2006.01)
(Continued)

(52) U.S. Cl.
CPC .................. *G06T 5/80* (2024.01); *G06T 5/50* (2013.01); *G06T 5/60* (2024.01); *G06T 7/0004* (2013.01);
(Continued)

(58) Field of Classification Search
None
See application file for complete search history.

(56) References Cited

U.S. PATENT DOCUMENTS

2015/0036914 A1* 2/2015 Sekiguchi .............. B82Y 10/00 382/149
2016/0336145 A1 11/2016 Ominami et al.
(Continued)

FOREIGN PATENT DOCUMENTS

JP 2013-044547 A 3/2013
JP 2016-146362 A 8/2016
(Continued)

OTHER PUBLICATIONS

Ce Wang, S. Kevin Zhou, & Zhiwei Cheng. (2020). First image then video: A two-stage network for spatiotemporal video denoising.*
Jaakko Lehtinen, Jacob Munkberg, Jon Hasselgren, Samuli Laine, Tero Karras, Miika Aittala, & Timo Aila. (2018). Noise2Noise: Learning Image Restoration without Clean Data.*
(Continued)

*Primary Examiner* — Andrew W Bee
*Assistant Examiner* — Christine Zhao
(74) *Attorney, Agent, or Firm* — MATTINGLY & MALUR, PC

(57) ABSTRACT

An image quality improvement system includes: an image quality improvement unit that improves the image quality of a low quality image; a deformation prediction unit that predicts a deformation amount that has occurred between a first low quality image and a different second low quality image, included in a series of input low quality images; and a deformation correction unit that corrects, based on the deformation amount predicted by the deformation prediction unit, one of a first prediction image obtained by applying processing by the image quality improvement unit to the first low quality image, the second low quality image, or a second prediction image obtained by applying processing by the image quality improvement unit to the second low quality image. The image quality improvement system learns to reduce the evaluation of a loss function between the first prediction and the second low quality image or the second prediction image.

8 Claims, 9 Drawing Sheets

(51) Int. Cl.
*G06T 5/60* (2024.01)
*G06T 7/00* (2017.01)

(52) U.S. Cl.
CPC ............... *G06T 2207/10056* (2013.01); *G06T 2207/20081* (2013.01); *G06T 2207/20084* (2013.01); *G06T 2207/30148* (2013.01); *G06T 2207/30168* (2013.01)

(56) References Cited

U.S. PATENT DOCUMENTS

| | | | |
|---|---|---|---|
| 2018/0240225 A1 | 8/2018 | Harada et al. | |
| 2018/0261426 A1 | 9/2018 | Kimura et al. | |
| 2024/0394846 A1* | 11/2024 | Huang | G06T 5/60 |

FOREIGN PATENT DOCUMENTS

| | | |
|---|---|---|
| JP | 2018-152217 A | 9/2018 |
| JP | 2019-008599 A | 1/2019 |
| JP | 2020-113769 A | 7/2020 |

OTHER PUBLICATIONS

Diederik P. Kingma, & Jimmy Ba. (2014). Adam: A Method for Stochastic Optimization.*

Adam Paszke, Sam Gross, Soumith Chintala, Gregory Chanan, Edward Yang, Zachary DeVito, Zeming Lin, Alban Desmaison, Luca Antiga, and Adam Lerer. (2017). Automatic differentiation in pytorch.*

International Search Report of PCT/JP2020/036792 dated Dec. 22, 2020.

* cited by examiner

PRESENT INVENTION

CONVENTIONAL TECHNIQUE

FIG. 8

(1) TRAINING DATA SELECTION UNIT (2) EVALUATION DATA SELECTION UNIT (3) TRAINING CONDITION SETTING UNIT
- IMAGE RESTORATION UNIT CNN CONFIGURATION: CNN CONFIGURATION 1
- LOSS FUNCTION (COEFFICIENT AT TIME OF WEIGHTED AVERAGE):
  MEAN SQUARE ERROR FROM SECOND LOW QUALITY IMAGE SUBJECTED TO DEFORMATION CORRECTION(1.0)
  MEAN SQUARE ERROR FROM SECOND PREDICTION IMAGE SUBJECTED TO DEFORMATION CORRECTION (1.0)
  MEAN SQUARE ERROR FROM FIRST LOW QUALITY IMAGE (1.0)
- NUMBER OF TIMES OF TRAINING: 100
- TRAINING RATE: 0.1
- CONFIGURATION SETTING OF DEFORMATION PREDICTION UNIT: DEFORMATION CORRECTION DATABASE 1

(4) TRAINING MODE SELECTION UNIT (6) TRAINING INSTRUCTION UNIT (5) TRAINING RESULT CHECK UNIT

IMAGE CHECK UNIT

LOW QUALITY IMAGE

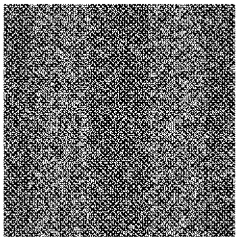

IMAGE RESTORATION IMAGE

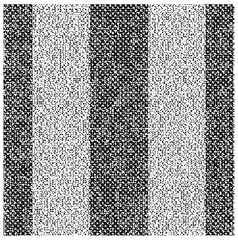

RESULT CHECK UNIT

| # | MODEL NAME | DATA INFORMATION | TRAINING CONDITION INFORMATION | EVALUATION VALUE |
|---|---|---|---|---|
| 1 | XXX | DATA 1 | CONDITION 1 | 30 |
| 2 | XXY | DATA 1 | CONDITION 2 | 40 |
| 3 | XXZ | DATA 2 | CONDITION 1 | 50 |
| ... | ... | ... | ... | ... |

IMAGE RESTORATION SYSTEM AND IMAGE RESTORATION METHOD

TECHNICAL FIELD

The present invention relates to a configuration and control of an inspection/measurement device that performs inspection or measurement with an electron microscope, and particularly relates to a technique that is effectively applied to inspection or measurement of semiconductor wafers or liquid crystal panels that are likely to cause imaging damages due to electron beams.

BACKGROUND ART

In a manufacturing line of semiconductors, liquid crystal panels, or the like, when a failure occurs at a beginning of a process, work of subsequent processes is wasted, and therefore manufacturing is advanced by providing an inspection/measurement process at each important phase of each process, and checking and maintaining a constant yield. These inspection/measurement processes use for example, a Critical Dimension-Scanning Electron Microscope (CD-SEM), a Defect Review-SEM (Defect Review-SEM), and the like to which a scanning electron microscope is applied.

For inspection and measurement that uses an electron microscope, a plurality of imaging results is accumulated to create and use a high quality image in order to improve accuracy or precision. However, an increase in the number of times of imaging leads to a decrease in throughput, and therefore it is required to generate a high quality image with as small a number of times of imaging as possible.

The related art of the technical field of the present invention is, for example, a technique as disclosed in PTL 1. PTL 1 discloses "an image noise reduction method for configuring a feedforward neural network that is trained with a created training image including noise, and a created teacher image including less noise than that of the training image, and outputs an image corresponding to the teacher image in response to an input of the training image".

CITATION LIST

Patent Literature

PTL 1: JP 2019-008599 A

SUMMARY OF INVENTION

Technical Problem

Above PTL 1 describes a technique of receiving an input of a few accumulated image, giving a high accumulated image as supervision, and predicting the high accumulated image from the few accumulated image. According to PTL 1, the high accumulated image with less noise is predicted from the few accumulated image with a small number of times of imaging.

However, in a case of inspection or measurement of a fine circuit pattern such as a semiconductor, there is a case where an imaging damage resulting from electron beam irradiation may occur in a circuit pattern per imaging, and a circuit shape is deformed. In such a case, it is difficult to create appropriate supervision from a high quality image created using an average image of few accumulated images. Furthermore, in a case where visual field deviation or luminance change due to charging occurs every plurality of times of imaging in addition to deformation of a circuit shape, too, it is difficult to create appropriate supervision with a simple average image.

It is therefore an object of the present invention to provide a highly accurate and highly reliable image restoration system and image restoration method that restore image quality of a low quality image by machine learning, and that can perform training with appropriate supervision for a sample whose image readily changes per imaging.

Solution to Problem

In order to solve the above problem, the present invention is an image restoration system that restores image quality of a low quality image, and includes: an image restoration unit that restores the image quality of the low quality image; a deformation prediction unit that predicts a deformation amount that has occurred between a first low quality image and a different second low quality image, these are included in a series of input low quality images; and a deformation correction unit that corrects one of a first prediction image, the second low quality image, or a second prediction image on a basis of the deformation amount predicted by the deformation prediction unit, the first prediction image being obtained by applying processing of the image restoration unit to the first low quality image, and the second prediction image being obtained by applying the processing of the image restoration unit to the second low quality image, and training is performed to reduce an evaluation of a loss function between the first prediction image corrected by the deformation correction unit, and the second low quality image or the second prediction image, or an evaluation of a loss function between the first prediction image, and the second prediction image or the second low quality image corrected by the deformation correction unit.

Furthermore, the present invention is an image restoration method including: (a) a step of obtaining a plurality of inspection images; (b) a step of applying an image restoration model to the obtained inspection images, and obtaining prediction images of the respective inspection images after the step (a); (c) a step of predicting a deformation amount between the obtained prediction images after the step (b); (d) a step of generating a corrected prediction image obtained by deforming an arbitrary prediction image into a prediction image of a different inspection image on a basis of the predicted deformation amount after the step (c); (e) a step of evaluating an error of image restoration using the generated modified prediction image and a correction-target inspection image after the step (d); and (f) a step of updating a parameter of the image restoration model to reduce the evaluated error of the image restoration after the step (e).

Advantageous Effects of Invention

According to the present invention, it is possible to realize a highly accurate and highly reliable image restoration system and image restoration method that restore image quality of a low quality image by machine learning, and that can perform training with appropriate supervision for a sample whose image readily changes per imaging.

Consequently, it is possible to quickly and highly accurately inspect and measure an electronic device.

Problems, configurations, and effects other than the above problem, configuration, and effect will be made apparent from the following embodiments.

BRIEF DESCRIPTION OF DRAWINGS

FIG. 8 is a view illustrating a training GUI according to embodiment 1 of the present invention.

DESCRIPTION OF EMBODIMENTS

Embodiments of the present invention will be described below with reference to the drawings. Note that a detailed description of overlapping portions will be omitted.

Embodiment 1

Figure 12:
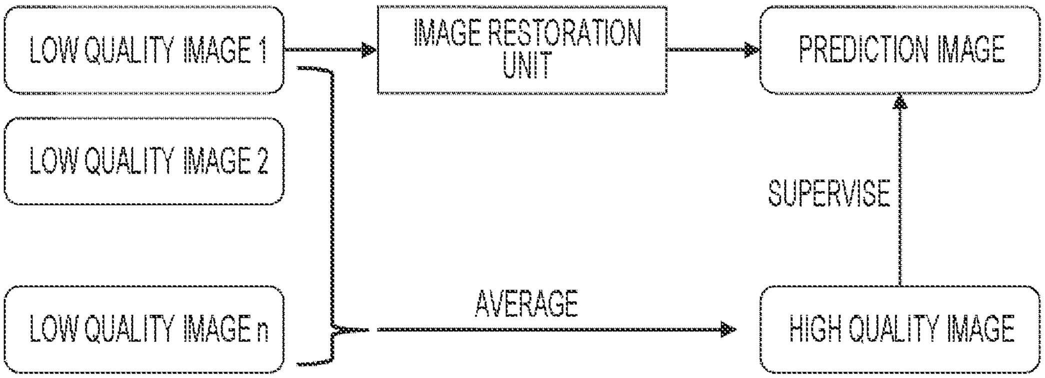
FIG. 12 is a view conceptually illustrating image restoration according to the conventional technique.

In order to facilitate understanding of image restoration according to the present invention, image restoration according to a conventional technique will be described first with reference to FIG. 12. FIG. 12 is a view conceptually illustrating image restoration according to above PTL 1.

As illustrated in FIG. 12, according to the conventional technique, a low quality image 1 is extracted as a correction target among a plurality of (n) low quality images obtained by imaging a same position of a same sample (e.g., a semiconductor wafer), and an image restoration unit performs image restoration processing using machine learning, and outputs a prediction image. On the other hand, accumulation processing (e.g., averaging processing) is performed on low quality images 2 to n different from the low quality image 1 to create a high quality image, and supervise this high quality image as a teacher image to a prediction image of the low quality image 1.

As described above, according to this method, in the case where a fine circuit pattern of a semiconductor integrated circuit or the like is inspected or measured, it is likely that an imaging damage resulting from electron beam irradiation may occur in a circuit pattern per imaging, and a circuit shape is deformed, and therefore it is difficult to create appropriate supervision (high quality image).

Figure 1:
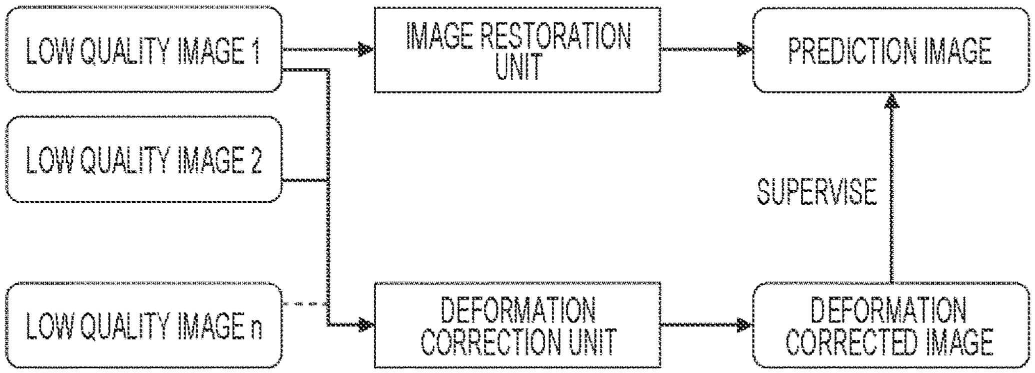
FIG. 1 is a view conceptually illustrating image restoration according to the present invention.

Next, an image restoration system and an image restoration method according to embodiment 1 of the present invention will be described with reference to FIGS. 1 to 9. FIG. 1 is a view conceptually illustrating image restoration according to the present invention.

As illustrated in FIG. 1, according to the present invention, a low quality image 1 is extracted as a correction target among a plurality of (n) low quality images obtained by imaging a same position of a same sample (e.g., a semiconductor wafer), and an image restoration unit performs image restoration processing using machine learning, and outputs a prediction image. On the other hand, deformation occurring between the low quality image 1 and each of low quality images 2 to n different from the low quality image 1 is predicted to supervise a deformation corrected image created by correcting this deformation by the deformation correction unit as a teacher image to a prediction image of the low quality image 1.

The low quality images 2 to n may be images that enable comparison of deformation with that of the low quality image 1, and may be only the one low quality image 2. That is, by obtaining at least two captured images of the low quality image 1 and the low quality image 2, it is possible to predict deformation, and create a teacher image (deformation corrected image).

Figure 2:
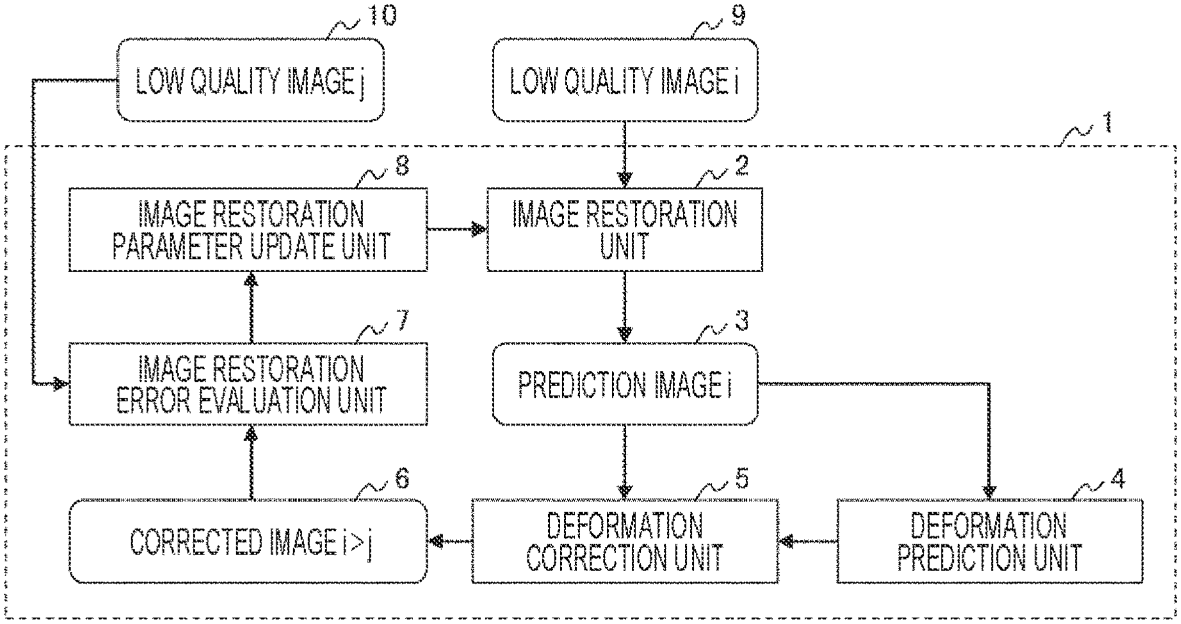
FIG. 2 is a block diagram illustrating a to embodiment 1 of the present invention.

A specific configuration for realizing the functions described with reference to FIG. 1 will be described with reference to FIG. 2. FIG. 2 is a block diagram illustrating a configuration of image restoration model training according to the present embodiment.

As illustrated in FIG. 2, an image restoration system 1 according to the present embodiment is configured to include an image restoration unit 2, a deformation prediction unit 4, a deformation correction unit 5, a corrected image 6, an image restoration error evaluation unit 7, and an image restoration parameter update unit 8.

The image restoration unit 2 applies image restoration processing to a low quality image i9 (first low quality image) included in a series of input low quality images, and creates a prediction image i3 (first prediction image). For the image restoration model in the image restoration unit 2, for example, an Encode-Decoder type Convolution Neural Network (CNN) such as UNet or a CNN adopting another structure is used.

The deformation prediction unit 4 predicts a deformation amount of the prediction image i3 (first prediction image) by, for example, using deformation amount data stored in advance in a deformation amount database (a deformation amount DB 19 in FIG. 6) to be described later. The deformation prediction unit 4 predicts a deformation amount (D) of each pixel of the prediction image.

The deformation correction unit 5 corrects the prediction image i3 (first prediction image) on the basis of the deformation amount predicted by the deformation prediction unit 4. In a case where, for example, the deformation correction unit 5 assumes that a corrected image Y' is an image deformed from a prediction image Y by the deformation amount (D), a [i, j] pixel of Y' is information of a [i+D [i, j, 0], j+D [i, j, 1]] pixel of Y. In this regard, the deformation amount D is a two-channel image having the same height and width as those of the prediction image Y, and each channel has a deformation amount in a height direction and a width direction in each image coordinate. In a case where D [i, i] is not an integer, the corrected image Y' is generated by a method such as bilinear sampling. The corrected image 6 is an image obtained by correcting deformation on the prediction image i3 on the basis of the deformation amount predicted by the deformation prediction unit 4 such that a circuit pattern shape matches with that of a low quality image j10.

Furthermore, the deformation correction unit 5 may predict not only circuit deformation due to an imaging damage, but also visual field deviation and luminance change per imaging. The visual field deviation and the luminance change may be subjected to position correction by matching images or correction of a change of a luminance value distribution.

The image restoration error evaluation unit 7 evaluates an error between the corrected image 6 (first prediction image) subjected to deformation correction by the deformation correction unit 5, and a low quality image j10 (second low quality image). An error function or a loss function used by the image restoration error evaluation unit 7 is, for example, an absolute error, a square error, or a likelihood function on the basis of a Gaussian distribution, a Poisson distribution, a gamma distribution, or the like.

On the basis of an evaluation result of the image restoration error evaluation unit 7, the image restoration parameter update unit 8 updates and optimizes parameters of the image restoration model in the image restoration unit 2 to reduce an evaluation of the loss function between the corrected image 6 (first prediction image) corrected by the deformation correction unit 5 and the low quality image j10 (second low quality image). This update is performed by, for example, stochastic gradient descent. Furthermore, the error function or the loss function used for error evaluation by the image restoration error evaluation unit 7 and the image restoration parameter update unit 8 may be calculated using a combination other than the first prediction image and the second low quality image. For example, the loss function may be calculated using the first prediction image and a second prediction image obtained by applying the image restoration processing to the second low quality image.

Furthermore, deformation correction from the first low quality image to the second low quality image is invertible, and therefore the deformation correction performed by the deformation correction unit 5 may be performed on the second low quality image or the second prediction image. That is, in a case of correction of imaging damages, when damages that thin a circuit occur in the first low quality image, correction for thickening the circuit in the second low quality image or the second prediction image may be performed, or invertible position correction or luminance value correction may be performed on visual field deviation or a change of the luminance value distribution likewise.

Furthermore, the error function or the loss function used for error evaluation by the image restoration error evaluation unit 7 and the image restoration parameter update unit 8 may be calculated using a combination of the first prediction image and the first low quality image. In this case, the deformation correction unit 5 may not perform deformation correction.

Furthermore, the error function or the loss function used for error evaluation by the image restoration error evaluation unit 7 and the image restoration parameter update unit 8 may be calculated using a combination of the error functions or the loss functions, or a weighted average.

Figure 3:
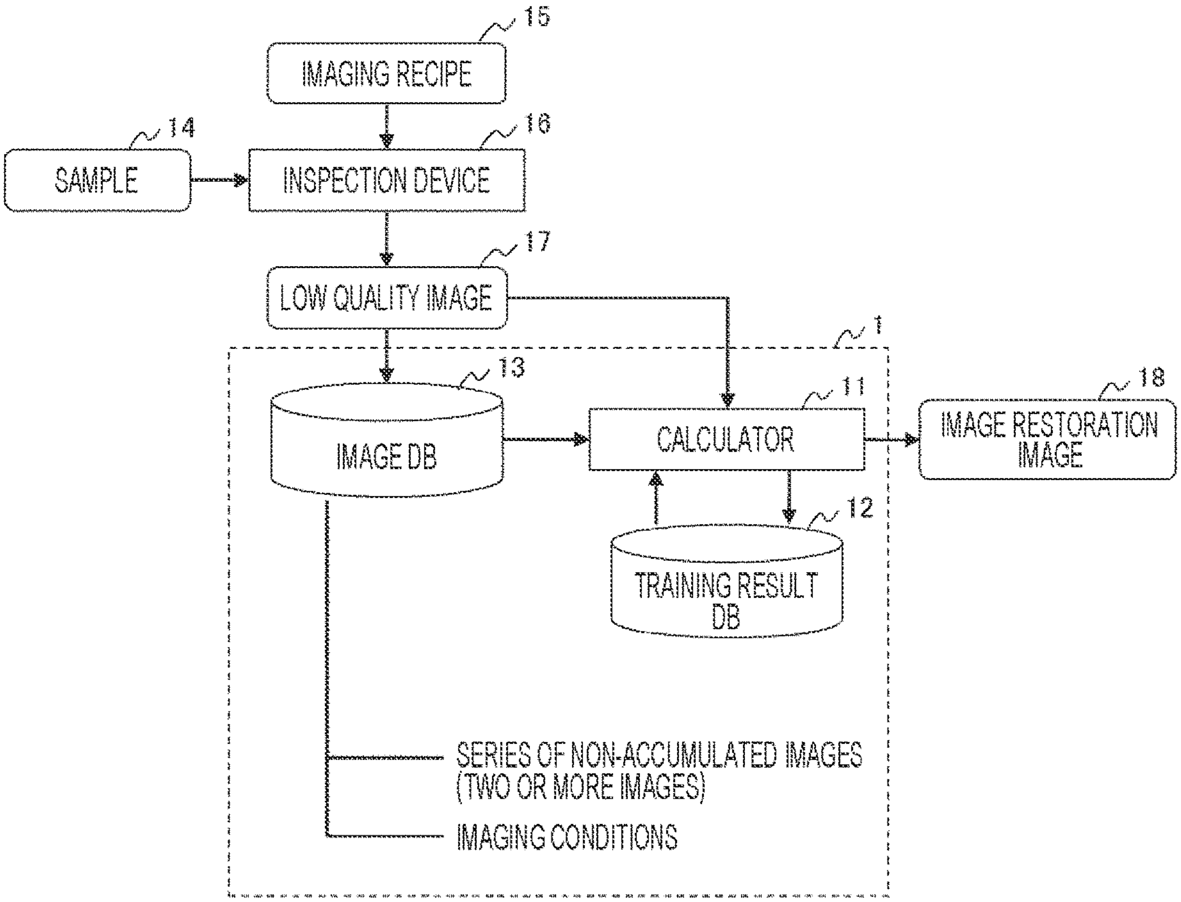
FIG. 3 is a block diagram illustrating a configuration of an image restoration system according to embodiment 1 of the present invention.

FIG. 3 illustrates a specific system configuration example in a case where the image restoration system 1 described with reference to FIG. 2 is mounted on an inspection device 16.

The inspection device 16 obtains a plurality of (n) low quality images 17 obtained by imaging a same position of a sample 14 (e.g., a semiconductor wafer) on the basis of an imaging recipe 15.

The image restoration system 1 includes an image database (DB) 13, a calculator 11, and a training result database (DB) 12.

The image database (DB) 13 stores two or more series of non-accumulated images and imaging conditions.

The image restoration model subjected to the training processing by the calculator 11 is stored in the training result database (DB) 12. Note that, although FIG. 3 illustrates an example where the training result database (DB) 12 is included in the image restoration system 1, the training result database (DB) 12 may be configured externally via a centralized monitoring system or the like.

The calculator 11 performs training processing of the image restoration model on the basis of the imaged low quality image 17 and information read from the image database (DB) 13, and outputs an image restoration image 18.

Figure 4:
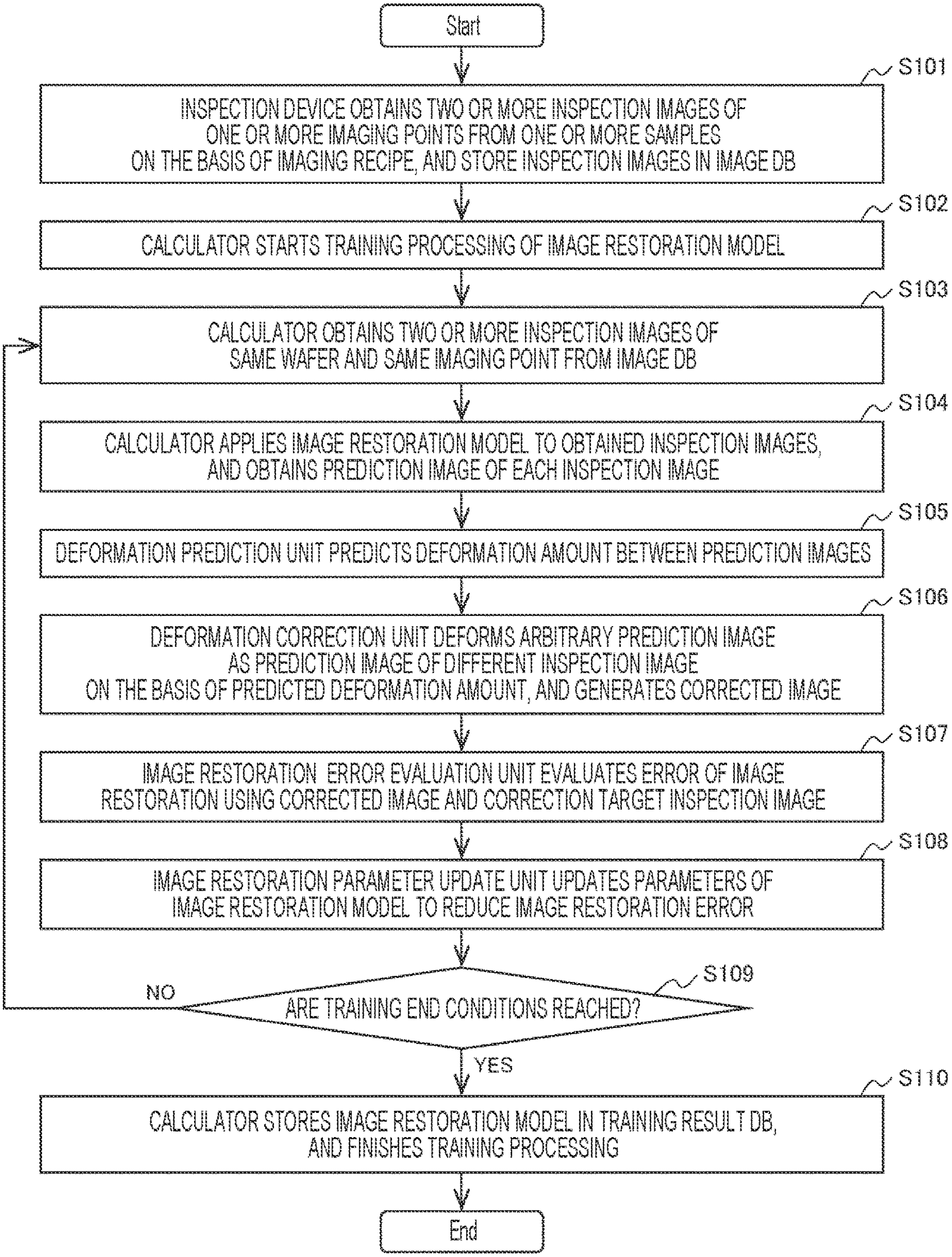
FIG. 4 illustrates a flowchart illustrating an image restoration method (training phase) according to embodiment 1 of the present invention.

Representative processing (image restoration method) by the above-described image restoration system 1 will be described with reference to FIGS. 4 and 5. FIG. 4 illustrates a flowchart illustrating processing of a training phase of the image restoration method according to the present embodiment.

First, in step S101, the inspection device 16 obtains two or more inspection images (low quality images 17) of one or more imaging points from the one or more samples 14 on the basis of the imaging recipe 15, and stores the obtained inspection images in the image database (DB) 13.

Next, in step S102, the calculator 11 starts training processing of the image restoration model.

Subsequently, in step S103, the calculator 11 obtains two or more inspection images of the same wafer and the same imaging point from the image database (DB) 13.

Next, in step S104, the calculator 11 applies the image restoration model to the obtained inspection images, and obtains a prediction image of each inspection image.

Subsequently, in step S105, the deformation prediction unit 4 predicts a deformation amount between the prediction images.

Next, in step S106, the deformation correction unit 5 deforms an arbitrary prediction image as a prediction image of a different inspection image on the basis of the predicted deformation amount, and generates a corrected image.

Subsequently, in step S107, the image restoration error evaluation unit 7 evaluates an error of image restoration using the corrected image and the correction-target inspection image. In this regard, the corrected image is the corrected image 6 in FIG. 2, and the correction-target inspection image is the low quality image 10 in FIG. 2.

Next, in step S108, the image restoration parameter update unit 8 updates the parameters of the image restoration model to reduce an image restoration error.

Subsequently, it is decided in step S109 whether or not training end conditions have been reached, and, in a case where it is decided that the training end conditions have been reached (YES), the flow moves to step S110, and the calculator 11 stores the image restoration model in the training result database (DB) 12, and finishes the training processing. On the other hand, when it is decided that the training end conditions are not reached (NO), the flow returns to step S103, and processing in and after step S103 is executed again.

Figure 5:
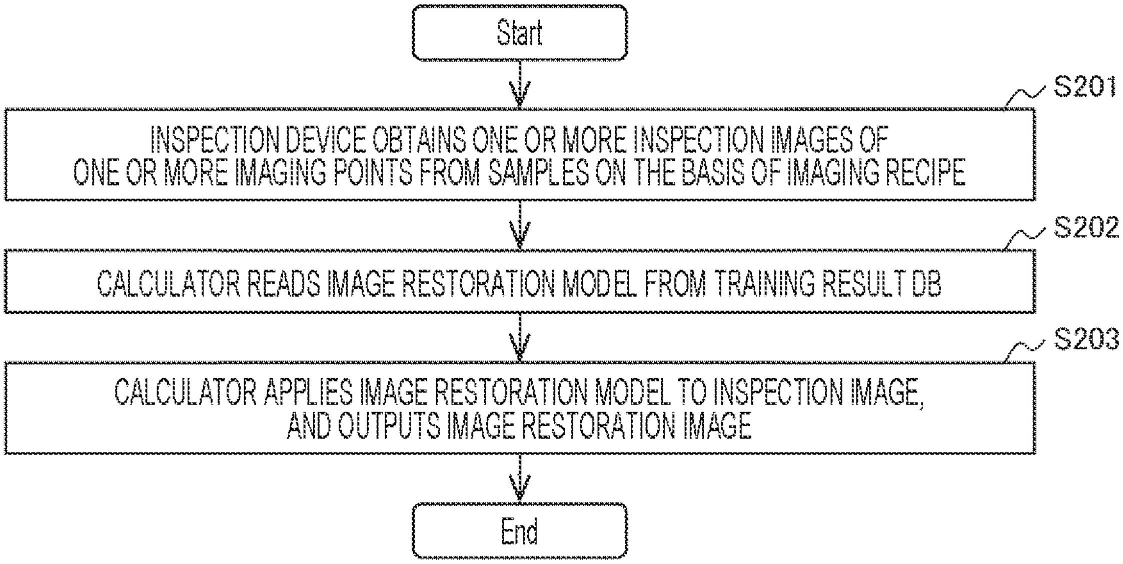
FIG. 5 illustrates a flowchart illustrating an image restoration method (inference phase) according to embodiment 1 of the present invention.

FIG. 5 illustrates a flowchart illustrating processing of an inference phase of the image restoration method according to the present embodiment.

First, in step S201, the inspection device 16 obtains one or more inspection images of one or more imaging points from the sample 14 on the basis of the imaging recipe 15.

Next, in step S202, the calculator 11 reads the image restoration model from the training result database (DB) 12.

Finally, in step S203, the calculator 11 applies the image restoration model to the inspection image, and outputs the image restoration image.

Figure 6:
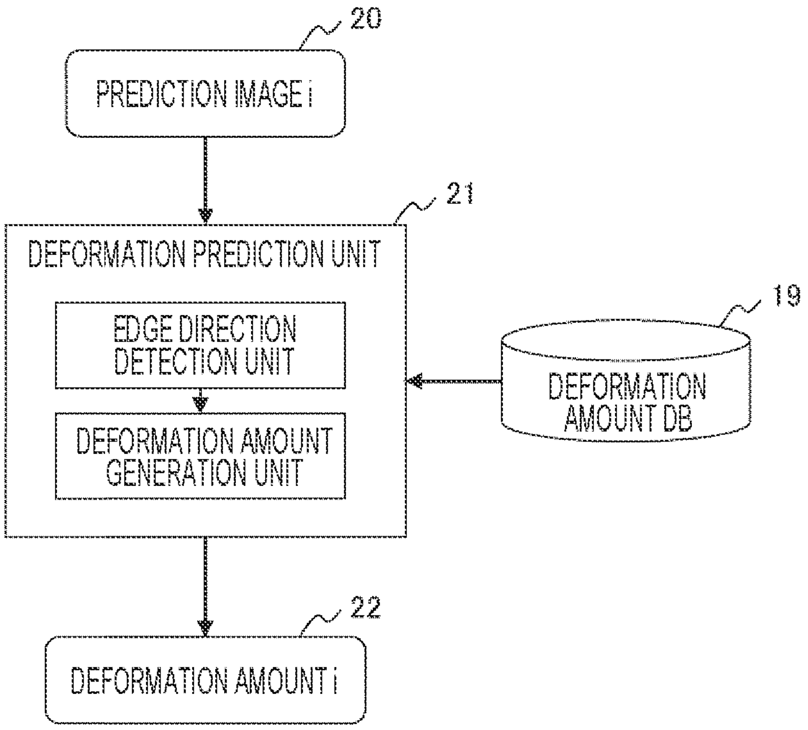
FIG. 6 is a block diagram illustrating a configuration of a deformation prediction unit in FIG. 2.

FIG. 6 is a block diagram illustrating a configuration of the deformation prediction unit according to the present embodiment. As illustrated in FIG. 6, a deformation prediction unit 21 predicts a deformation amount of a prediction image i20 on the basis of the deformation amount data stored in advance in the deformation amount database (DB) 19, and outputs a deformation amount i22.

Deformation occurring in a circuit pattern generally occurs at a circuit end part. Furthermore, the deformation occurs in such a direction the circuit pattern is thinned. Therefore, the deformation prediction unit 21 extracts an edge of a circuit pattern from the prediction image i20, and obtains such a deformation amount that the pattern is thinned. The deformation prediction unit 21 in FIG. 6 includes an edge direction detection unit and a deformation amount generation unit. The edge direction detection unit detects an edge of the pattern, and detects a direction directed toward a pattern center per edge as an edge direction. Subsequently, the deformation amount generation unit generates the deformation amount on the basis of the edge direction detected by the edge direction detection unit. By referring to a deformation amount stored in the deformation amount DB 19 and generated per imaging condition, calculating a deformation amount corresponding to the input image, and giving the deformation amount to the region of each edge, the deformation amount generated herein becomes a two-channel image having the same height and width as those of the prediction image i20. Furthermore, deformation amount data stored in the deformation amount DB 19 may depend on not only imaging conditions, but also an edge shape.

Figure 7A:
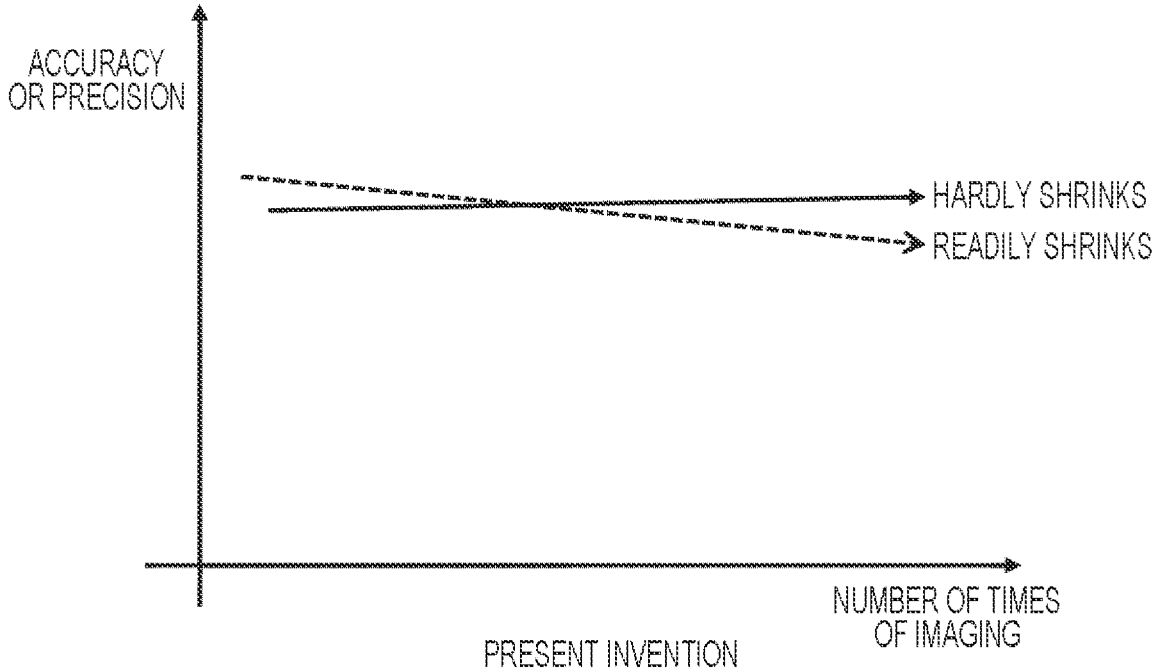
FIG. 7A is a view conceptually illustrating a relationship between the number of times of imaging and accuracy or precision according to the present invention.

The effect of the present invention will be described with reference to FIGS. 7A and 7B. FIG. 7A is a view conceptually illustrating a relationship between the number of times of imaging and accuracy or precision according to the present invention, and FIG. 7B is a view conceptually illustrating a relationship between the number of times of imaging and accuracy or precision according to the conventional technique.

Figure 7B:
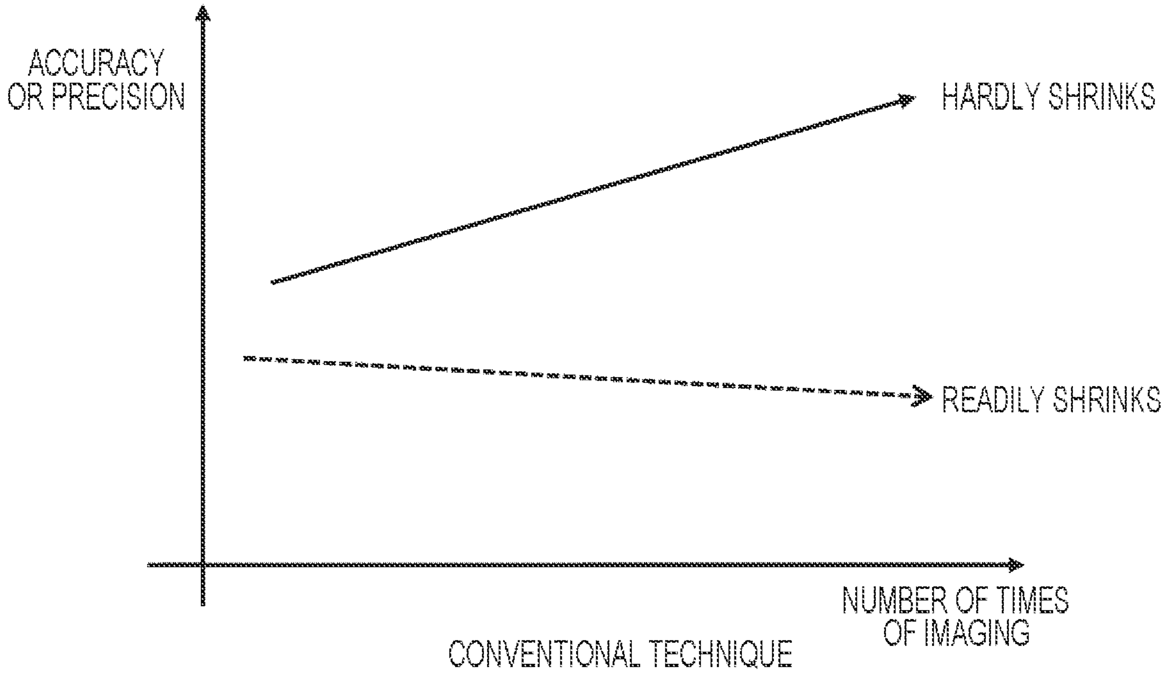
FIG. 7B is a view conceptually illustrating a relationship between the number of times of imaging and accuracy or precision according to the conventional technique.

As illustrated in FIG. 7B, according to, for example, the conventional technique as described in PTL 1, in a case where a sample hardly deforms (shrinks), as the number of times of imaging increases, image quality of a high quality image that becomes a teacher image improves, and, accordingly, accuracy or precision of the inspection/measurement device also improves. On the other hand, in a case where the sample readily deforms (shrinks), as the number of times of imaging increases, the sample deforms (shrinks), and therefore it is difficult to create an appropriate teacher image (high quality image), inspection and measurement are performed on the basis of the image restoration image including deformation information of the sample, and accuracy or precision of the inspection/measurement device lowers. By contrast with this, according to the present invention, it is possible to create an appropriate teacher image (deformation corrected image) even for a sample whose shape readily deforms (shrinks) during imaging as illustrated in FIG. 7A, and it is possible to perform appropriate training with this teacher image (deformation corrected image), so that it is possible to guarantee stable accuracy or precision of the inspection/measurement device regardless of the number of times of imaging.

Figure 9:
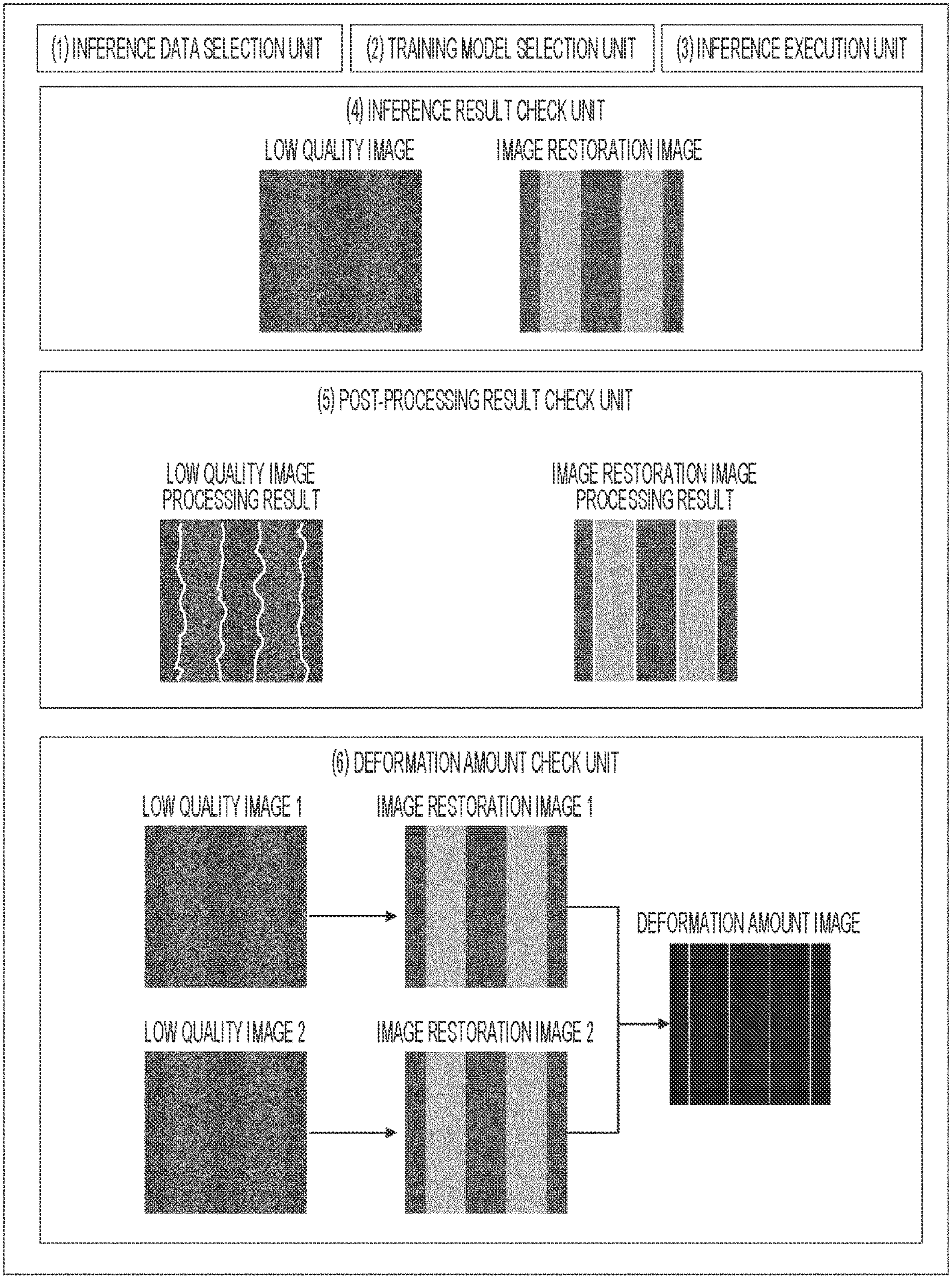
FIG. 9 is a view illustrating an inference GUI according to embodiment 1 of the present invention.

A specific example of an input/output device Graphical User Interface (GUI) used to control the image restoration system 1 will be described with reference to FIGS. 8 and 9. FIG. 8 is a view illustrating a training GUI, and FIG. 9 is a view illustrating an inference GUI.

As illustrated in FIG. 8, in the training GUI, (1) a training data selection unit, (2) an evaluation data selection unit, (3) a training condition setting unit, (4) a training mode selection unit, (5) a training result check unit, (6) a training instruction unit, and the like are set.

(5) In the training result check unit, for example, an image check unit and a result check unit are set. By displaying a low quality image before image restoration and an image restoration image after the image restoration side by side on the image check unit, an operator can advance work while checking an effect of the image restoration of the image restoration system 1.

(3) In the training condition setting unit, a configuration of the CNN used by the image restoration unit 2, a loss function to be used and a coefficient used for a weighted average, a training schedule such as a number of times of training and a training rate, and the like are set. Furthermore, when deformation correction is performed, a database used for the deformation correction in this case may be designated.

(4) The training mode selection unit selects whether or not to perform deformation correction. For example, it is also possible to not select to perform deformation correction on a sample that hardly deforms.

As illustrated in FIG. 9, in the inference GUI, (1) an inference data selection unit, (2) a training model selection unit, (3) an inference execution unit, (4) an inference result check unit, (5) a post-processing result check unit, (6) a deformation amount check unit, and the like are set.

(4) In the inference result check unit, for example, a low quality image before image restoration and an image restoration image after the image restoration are displayed side by side. (5) The post-processing result check unit displays, for example, a result obtained by applying post-processing to each of the low quality image before the image restoration and the image restoration image after the image restoration. The post-processing described herein refers to edge extraction for a captured image, measurement of a length of a specific site, defect inspection, or the like. FIG. 9 has exemplified the edge detection. By checking from this post-processing result check unit whether it is possible to obtain a desired result when the post-processing is applied to the image to which the image restoration has been applied, a user can determine whether or not the obtained image restoration image can be used. Furthermore, (6) the deformation amount check unit displays pluralities of low quality images and image restoration images, and displays a deformation amount image obtained from these images.

Note that, although the present embodiment has described the example where deformation correction is applied to the prediction image after image restoration, the deformation correction may be directly applied to a low quality image, or a teacher image may be generated by performing averaging processing or the like on a result obtained by applying deformation correction to a plurality of prediction images or low quality images, and used for training.

Embodiment 2

Figure 10:
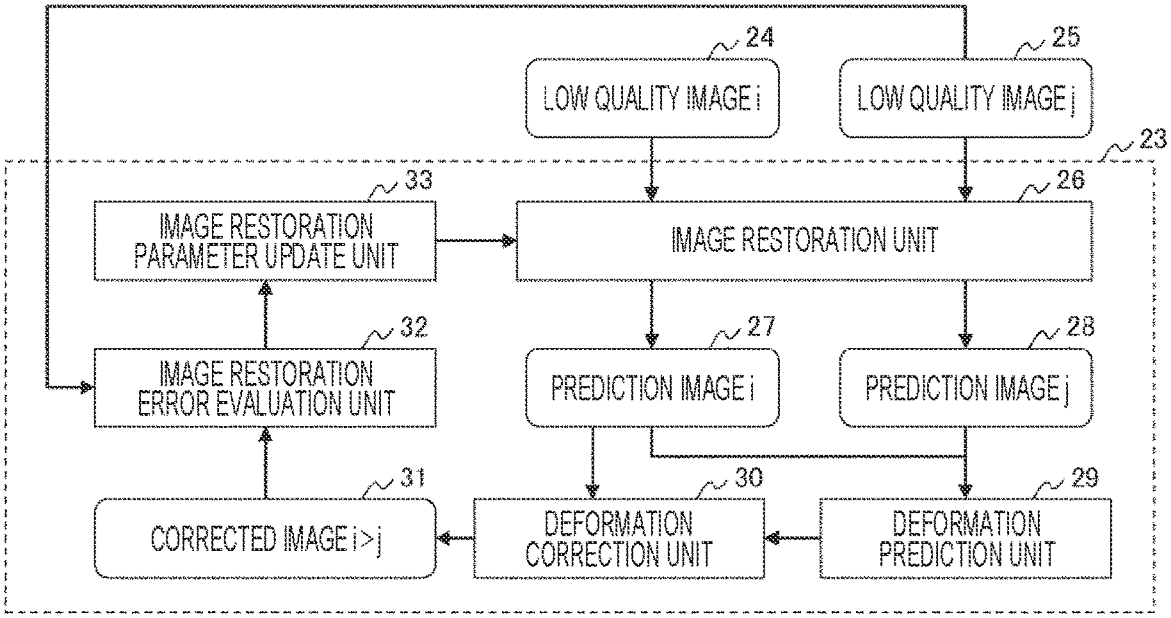
FIG. 10 is a block diagram illustrating a to embodiment 2 of the present invention.

An image restoration system and an image restoration method according to embodiment 2 of the present invention will be described with reference to FIGS. 10 and 11. FIG. 10 is a block diagram illustrating a configuration of image restoration model training according to the present embodiment, and corresponds to a modified example of embodiment 1 (FIG. 2). The present embodiment differs from embodiment 1 (FIG. 2) in that a deformation prediction unit is configured as a CNN similarly to an image restoration unit 26 without using a deformation amount DB 19. Other basic components are similar to those of embodiment 1.

As illustrated in FIG. 10, an image restoration system 23 according to the present embodiment is configured to include the image restoration unit 26, a deformation prediction unit 29, a deformation correction unit 30, a corrected image comparison unit 31, an image restoration error evaluation unit 32, and an image restoration parameter update unit 33.

A low quality image i24 (first low quality image) included in the input series of low quality images, and a low quality image j25 (second low quality image) different from the low quality image i24 (first low quality image) are both applied image restoration processing by the image restoration unit 26, and a prediction image i27 and a prediction image j28 are respectively created.

Both of the prediction image i27 and the prediction image j28 are input to the deformation prediction unit 29, and the deformation prediction unit 29 predicts a deformation amount between the respective prediction images. The deformation prediction unit 29 is the CNN similarly to the image restoration unit 26, and training of the deformation prediction unit 29 is performed according to a configuration illustrated in FIG. 11.

The deformation correction unit 30 corrects the prediction image i27 on the basis of the deformation amount between the respective prediction images predicted by the deformation prediction unit 29.

The corrected image comparison unit 31 compares a modified prediction image i and a modified prediction image j corrected by the deformation correction unit 30.

The image restoration error evaluation unit 32 evaluates an error between the modified prediction image i and the modified prediction image j corrected by the deformation correction unit 30 on the basis of a comparison result of the corrected image comparison unit 31.

On the basis of the evaluation result of the image restoration error evaluation unit 32, the image restoration parameter update unit 33 updates and optimizes parameters of an image restoration model of the image restoration unit 26 to reduce the evaluation of an error function between the modified prediction image i and the modified prediction image j corrected by the deformation correction unit 30.

Figure 11:
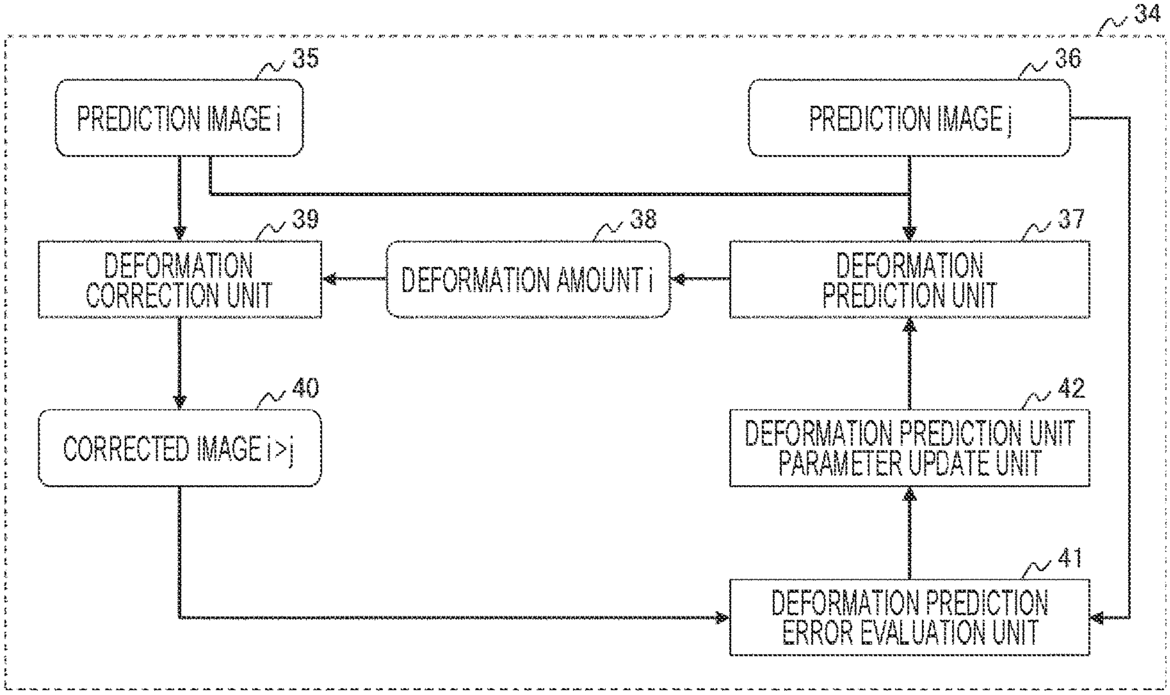
FIG. 11 is a block diagram illustrating a configuration of a deformation prediction unit in FIG. 11.

FIG. 11 is a block diagram illustrating a configuration of the deformation prediction unit at a time of training according to the present embodiment. As illustrated in FIG. 11, the deformation prediction unit 37 receives an input of a prediction image i35 and a prediction image j36, and predicts a deformation amount i38. This deformation amount i38 is a deformation amount used by the deformation correction unit 30. FIG. 11 illustrates the configuration for training a deformation prediction unit 37 for calculating the appropriate deformation amount i38. The deformation prediction unit 37 receives an input of the prediction image i35 and the prediction image j36, and predicts the deformation amount i38. Subsequently, the deformation correction unit 39 deforms the prediction image i35 on the basis of the prediction image i35 and the deformation amount i38 such that the prediction image i35 matches with a circuit pattern shape of the prediction image j36, and obtains a corrected image 40. Subsequently, a deformation prediction error evaluation unit 41 evaluates an error between the corrected image 40 and the prediction image j36. The error evaluated herein is, for example, an absolute error, a square error, a likelihood function on the basis of a Gaussian distribution, a Poisson distribution, a gamma distribution, or Kullback-Leibler divergence. A deformation prediction unit parameter update unit 42 updates the parameters of the deformation prediction unit 37 to reduce the error predicted by the deformation prediction error evaluation unit 41. This update is performed by, for example, stochastic gradient descent.

Furthermore, the prediction performed herein may be performed not only as prediction for deformation with regard to a circuit pattern shape, but also as prediction of a visual field deviation amount and prediction of a correction amount of a luminance value distribution similarly to embodiment 1. Even in this case, the parameters of the deformation prediction unit 37 are updated to reduce an error function or a loss function between the corrected image 40 obtained by correcting the prediction image i35 by the deformation prediction unit 37 on the basis of deformation of a predicted circuit pattern shape, a visual field deviation amount, and a correction amount of a luminance value distribution, and the prediction image j36.

Furthermore, similarly to embodiment 1, prediction of the deformation amount performed herein may be performed for deformation for adjusting the prediction image i35 to the prediction image j36, or conversely for deformation for adjusting the prediction image j36 to the prediction image i35.

Such training is performed similarly to the training flow of the image restoration unit illustrated in FIG. 4. Furthermore, the deformation prediction unit 37 may perform training simultaneously with the image restoration unit or individually.

In a case where the deformation prediction unit 37 described in embodiment 2 is used, (3) the training condition setting unit in FIG. 8 may add a setting item related to the training of the deformation prediction unit 37. That is, items related to a network structure of the deformation prediction unit 37, a loss function, and a training schedule may be added.

Furthermore, the present invention is not limited to the above embodiments, and includes various modified examples. For example, the above embodiments have been described in detail to help understanding of the present invention, and is not necessarily limited to those including all described components. Furthermore, it is possible to replace part of components of a certain embodiment with components of the other embodiment, and it is also possible to add the components of the other embodiment to the components of the certain embodiment. Furthermore, the other components can be added to, deleted from, or replaced with part of the components of each embodiment.

REFERENCE SIGNS LIST

1, 23 image restoration system
2, 26 image restoration unit
3, 20, 27, 35 prediction image i
4, 21, 29, 34, 37 deformation prediction unit
5, 30, 39 deformation correction unit
6, 31, 40 corrected image (corrected image i>j)
7, 32 image restoration error evaluation unit
8, 33 image restoration parameter update unit
9, 24 low quality image i
10, 25 low quality image j
11 calculator
12 training result database (DB)
13 image database (DB)

14 sample
15 imaging recipe
16 inspection device
17 low quality image
18 image restoration image
19 deformation amount database (DB)
20 prediction image i
22, 38 deformation amount i
28, 36 prediction image j
41 deformation prediction error evaluation unit
42 deformation prediction unit parameter update unit

The invention claimed is:

1. An image restoration system that restores image quality of a low quality image, the image restoration system comprising:

at least one database storing a plurality of images, including a first low quality image and a second low quality image, obtained by imaging a same position of a same sample plural times by an inspection device, storing an image restoration model, and storing deformation amount data determined in advance; and a processor configured to:

restore the image quality of the first low quality image to create a first prediction image using the image restoration model;

predict a deformation amount in at least a height and width direction for each pixel of the first prediction image using the deformation amount data determined in advance;

correct the first prediction image using the deformation amount for each pixel of the first prediction image;

evaluate a loss function between the corrected first prediction image and the second low quality image; and update and optimize parameters of the image restoration model to reduce the evaluation of the loss function between the corrected first prediction image and the second low quality image.

2. The image restoration system according to claim 1, wherein the processor is configured to predict a deformation amount between respective prediction images on a basis of deformation amount data stored in advance in a deformation amount database.

3. The image restoration system according to claim 1, wherein the processor is configured to obtain a prediction image of each low quality image by machine learning that uses a Convolution Neural Network (CNN).

4. The image restoration system according to claim 1, wherein the processor is further configured to:

evaluate the loss function, using an absolute error, a square error, or a likelihood function on a basis of one of a Gaussian distribution, a Poisson distribution, and a gamma distribution.

5. An image restoration method in a system that restores image quality of a low quality image, the image restoration method comprising the steps of:

storing, in at least one database, a plurality of images, including a first low quality image and a second low quality image, obtained by imaging a same position of a same sample plural times by an inspection device; an image restoration model; and deformation amount data determined in advance; and restoring the image quality of the first low quality image to create a first prediction image using the image restoration model;

predicting a deformation amount in at least a height and width direction for each pixel of the first prediction image using the deformation amount data determined in advance;

correcting the first prediction image using the deformation amount for each pixel of the first prediction image;

evaluating a loss function between the corrected first prediction image and the second low quality image; and updating and optimizing parameters of the image restoration model to reduce the evaluation of the loss function between the corrected first prediction image and the second low quality image.

6. The image restoration method according to claim 5, further comprising the step of:

predicting a deformation amount between respective prediction images on a basis of deformation amount data stored in advance in a deformation amount database.

7. The image restoration method according to claim 5, further comprising the step of:

obtaining a prediction image of each low quality image by machine learning that uses a Convolution Neural Network (CNN).

8. The image restoration method according to claim 5, wherein evaluating the error of the image restoration, using an absolute error, a square error, or a likelihood function on a basis of one of a Gaussian distribution, a Poisson distribution, and a gamma distribution.

* * * * *